United States Patent
McClelland et al.

(10) Patent No.: US 6,586,904 B2
(45) Date of Patent: Jul. 1, 2003

(54) COMPENSATION FOR VARIABLE VOLTAGE

(75) Inventors: Michael Leo McClelland, Leeds (GB); Jonathan Richard Quinn, Harrogate (GB)

(73) Assignee: Switched Reluctance Drives, Ltd., Harrogate (GB)

( * ) Notice: Subject to any disclaimer, the term of this patent is extended or adjusted under 35 U.S.C. 154(b) by 0 days.

(21) Appl. No.: 10/093,168

(22) Filed: Mar. 6, 2002

(65) Prior Publication Data

US 2002/0125852 A1 Sep. 12, 2002

(30) Foreign Application Priority Data

Mar. 6, 2001 (GB) .............................................. 0105502

(51) Int. Cl.⁷ ................................................ H02P 1/46
(52) U.S. Cl. ........................ 318/701; 318/717; 318/723; 318/798; 318/815; 388/907.5; 388/902; 388/815
(58) Field of Search ................................ 318/701, 717, 318/723, 798, 815, 254, 138, 439; 388/815, 907.5, 902

(56) References Cited

U.S. PATENT DOCUMENTS

| 5,724,477 A | 3/1998 | Webster et al. | |
|---|---|---|---|
| 6,291,949 B1 * | 9/2001 | Green | 318/254 |
| 6,396,237 B2 * | 5/2002 | Mayes | 318/701 |
| 6,495,985 B1 * | 12/2002 | Mayes et al. | 318/701 |

OTHER PUBLICATIONS

Stephenson, et al., "The Characteristics, Design and Applications of Switched Reluctance Motors and Drives," PCIM '93, Nürnberg, Germany, Conference & Exhibition, Jun. 21–24, 1993, pp. 1–68.

* cited by examiner

Primary Examiner—Karen Masih
(74) Attorney, Agent, or Firm—Dicke, Billig & Czaja, PLLC

(57) ABSTRACT

A switched reluctance drive is supplied from a voltage source which varies from the voltage at which the control laws for the drive were determined. The control system compensates for this by modifying both the speed and torque values used to determine the correct firing angles for the demanded load. The system works over a very wide range of voltage variation and is independent of the shape of the torque/speed curve of the drive.

25 Claims, 4 Drawing Sheets

US 6,586,904 B2

COMPENSATION FOR VARIABLE VOLTAGE

CROSS-REFERENCE TO RELATED APPLICATION

The subject matter of this application is related to the subject matter of British Patent Application No. GB 0105502.9, priority to which is claimed under 35 U.S.C. §119 and which is incorporated herein by reference.

BACKGROUND OF THE INVENTION

1. Field of the Invention

Embodiments of the present invention generally relate to an apparatus and method of compensating for DC link voltage variations in an electric drive system. More particularly, embodiments of the present invention relate to the operation of a switched reluctance drive that periodically reads a value corresponding to a DC link voltage and adjusts a speed indication signal to compensate for changes in the DC link voltage. The compensated speed signal is transmitted to a controller where it is used to compensate the energization of the windings of the switched reluctance drive.

2. Description of Related Art

The general theory of the design and operation of switched reluctance machines is well known and is discussed, for example, in "The Characteristics, Design and Applications of Switched Reluctance Motors and Drives", by Stephenson and Blake and presented at the PCIM '93 Conference and Exhibition at Nuremberg, Germany, Jun. 21–24, 1993 and incorporated herein by reference. The general construction and operation of controllers for switched reluctance drives is generally understood and is described herein for background purposes only.

The switched reluctance motor is generally constructed without windings or permanent magnets on the moving part of the motor (called the rotor). The stationary part of most switched reluctance motors (called the stator) includes coils wound around stator poles that carry unidirectional current. In one type of switched reluctance motor, coils around opposing stator poles are connected in series or parallel to form one phase winding of a potentially multi-phase switched reluctance motor. Motoring torque is produced by applying a voltage across each of the phase windings in a predetermined sequence that is synchronized with the angular position of the rotor so that a magnetic force of attraction results between poles of the rotor and stator as they approach each other. Similarly, generating action is produced by positioning the pulse of voltage in the part of the cycle where the poles are moving away from each other. In typical operation, each time a phase winding of the switched reluctance machine is energized, magnetic flux is produced by the phase winding, thereby causing a force of attraction on the rotor poles.

A typical prior art drive is shown schematically in FIG. 1 driving a load 19. The arrangement includes a DC power supply 11 that can be either a battery or rectified and filtered AC mains. The DC voltage provided by the power supply 11 is supplied across a DC link, represented as line 10, and switched across phase windings 16 of the motor 12 by a power converter 13 under the control of the electronic control unit 14. A current transducer 18 is used to provide current feedback signals to the controller. In the present application, the DC voltage provided to the switched reluctance machine (whether from a battery, rectifier or otherwise) is referred to as the "DC link voltage".

For proper operation of the drive, the switching must be correctly synchronized to the angle of rotation of the rotor. The performance of a switched reluctance machine depends, in part, on the accurate timing of phase energization with respect to rotor position. Detection of rotor position is conventionally achieved by using a transducer 15, shown schematically in FIG. 1, such as a rotating toothed disk mounted on the machine rotor, which cooperates with an optical or magnetic sensor mounted on the stator. A pulse train indicative of rotor position relative to the stator is generated and supplied to control circuitry 14, allowing accurate phase energization.

In order to maintain the speed and related torque developed by a switched reluctance machine, it is desirable to control carefully the instants at which voltage is applied to the phase windings. However, changes in the voltage of the AC supply and changes in the electrical environment in which the drive system operates often result in a DC link voltage that varies over time. Because the supply voltage can vary significantly, a control scheme that ignores changes in supply voltage may experience a significant reduction in ability to control the machine as demanded by the user. This is because the flux produced by the phase windings is directly related to the applied voltage. Accordingly, a change in the supply voltage may result in more or less flux produced by the phase windings than would otherwise be desired. This undesirable change in the flux in the motor can result in degraded performance.

In most known switched reluctance drives, the relationship between the speed of the motor, the desired torque and the time for which voltage is applied to the phase windings is determined empirically through a process referred to as characterization, in which the operating parameters of the motor are determined for a wide variety of operating conditions. These operating parameters are then stored in an analog or digital circuit called a control law table.

Typically, a digital control law table is simply a series of storage locations in a memory of some sort, in which each location corresponds to a point on a control map. For that point, typical systems store an on-angle, an off-angle and possibly a free-wheel angle which will be appropriate for that operating point. These parameters may be stored in adjacent locations in the table. Alternatively, the table may be sub-divided and be thought of as a series of tables, each holding values for one of the parameters.

An example of a control law table is shown in FIG. 2. In this example, the torque is discretized into 128 values at any speed, i.e. at any chosen speed, 100% torque at that speed corresponds to the $128^{th}$ storage location and 50% torque corresponds to the $64^{th}$ location, etc. Likewise, the speed is discretized, but in this case into 256 values. In each location in the table are stored control parameters A for controlling the machine to provide the corresponding speed and torque. As mentioned above, each of the parameters A could be a series of control parameters or could be a single control parameter, with each location of the table containing a pointer to other tables to enable other parameters to be found. Other methods of storing the data are known in the art, for example, a sparse matrix of 16×16 locations could be used and some method of interpolation used in real-time to determine the appropriate parameter values.

FIGS. 3 and 4 show examples of control maps that correspond to control law tables. In these, the horizontal axis represents speed and extends up to a maximum of 256 units, which is representative of the maximum speed of the drive. The solid line represents the maximum torque available at any speed. Any one point on the map corresponds to a location in the control law table holding the parameter(s) required to operate at that point. The example of FIG. 3 is representative of a system with a relatively constant torque output, whereas the example of FIG. 4 is representative of a system in which the torque output changes significantly with speed.

During operation of the drive, the control system provides the control law table with signals representing the speed of the motor and the desired torque and thus finds the firing angles appropriate to that operating condition. These firing angles are used to control the switches and thus control the energization of the phase windings. The use of motor controllers with control law tables is generally understood and is not discussed herein.

In order to minimize the effort involved in the characterizing process, it is common practice to keep the DC link voltage constant during the process. Realizing that the DC link voltage will typically vary when the drive system is installed in a working environment, the characterization is sometimes done assuming that the DC voltage is at its lowest expected value. In other words, characterization is done assuming the "worst case" DC link voltage. This type of characterization is undesirable to the extent that it characterizes the switched reluctance drive to run in a worst-case scenario (which may seldom occur) rather than at the desired optimum DC link value, at which the efficiency of the drive would be at its highest. In addition, an increase in operating voltage may increase the available torque and current to such an extent that components of the drive may overheat and fail. Other drives may be characterized at their optimum DC link voltage. For these drives, there must be some compensation for changes in the DC link voltage during operation or the drive will suffer diminished performance, particularly at low supply voltages.

Some switched reluctance drives use an analog system to compensate for DC link voltage variations. In general, these systems compensate for the changes in the DC link voltage by adjusting the speed signal provided to the control law table so that the speed signal provided to the controller is not the actual speed of the motor but a modified speed signal that represents the actual speed signal modified by a signal representative of the DC link voltage. Other drives use digital methods of compensation for voltage variations. For example, commonly assigned U.S. Pat. No. 5,724,477 (Webster et al.), incorporated herein by reference, discloses a method of DC link compensation that uses digital sampling of the DC link voltage, using an analog to digital converter (ADC), to determine variations.

In Webster, a DC link voltage is sampled using an ADC, the sampled voltage being fed into a controller where the ratio of the characterizing voltage to the measured operating voltage is used to modify the actual rotor speed to produce a compensated speed parameter with which to interrogate the control law table. This means that the compensated speed signal is adjusted inversely to the measured DC link voltage. For example, a rise in DC link voltage produces a smaller-valued, compensated speed signal, while a fall in DC link voltage produces a larger-valued, compensated speed signal. The compensated speed signal is then applied by the controller to index the control law table and hence select appropriate firing angles.

As an example of the application of the method of Webster, if the characterization is done for a DC link voltage of 560V and the drive was being operated at 538V at a speed represented by 227 units, then by applying linear scaling to the speed signal [i.e. (560/538)*227], a compensated speed of 236 units is obtained. This compensated speed is used to interrogate the control law table for whatever level of torque is required. In this case, the change in voltage is relatively small (around 4% of the characterizing voltage). If the torque/speed profile is relatively flat in the operating region, as shown, for example in FIG. 3, the combination of these factors means that the change in torque between the actual and compensated speeds is small. For example, if the demanded torque were 80% (so that the firing angles in the storage location 80/100*128=102 are used), storage location 102 at the compensated speed will probably supply firing angles that give a torque value so close to 80% that the difference is negligible. In contrast, if the slope of the torque curve were large, such as shown in FIG. 4, the torque value corresponding to the location at the compensated speed would be very different from the torque value for the uncompensated speed. FIG. 4 shows the error in the torque for a 40% variation in voltage. This makes the prior art compensation methods unsuitable in many circumstances.

While the above-described systems can work well over a limited range of voltage variation, depending on the form of the torque/speed curve, they do not give good results when widely varying voltages are encountered. Such circumstances arise particularly in systems not connected to the public utility supply, e.g. in aerospace, marine or automotive environments, where voltage variations of over 50% are not uncommon. While these variations could be partially catered for by characterizing the system at different voltages, this is expensive in development time, requires considerably more storage space in the control system, makes reading the control laws more difficult and, at best, gives accurate compensation only at certain voltages.

SUMMARY OF THE INVENTION

Given the disadvantages of known compensation systems, it is desirable to have a DC link voltage compensation system that is accurate, covers a wide range of DC link voltages and is relatively inexpensive. Embodiments of the invention achieve these and/or other advantages.

BRIEF DESCRIPTION OF THE DRAWINGS

Various embodiments in which the invention is embodied will now be described with reference to the accompanying drawings, of which.

DETAILED DESCRIPTION OF PREFERRED EMBODIMENTS

Figure 5:
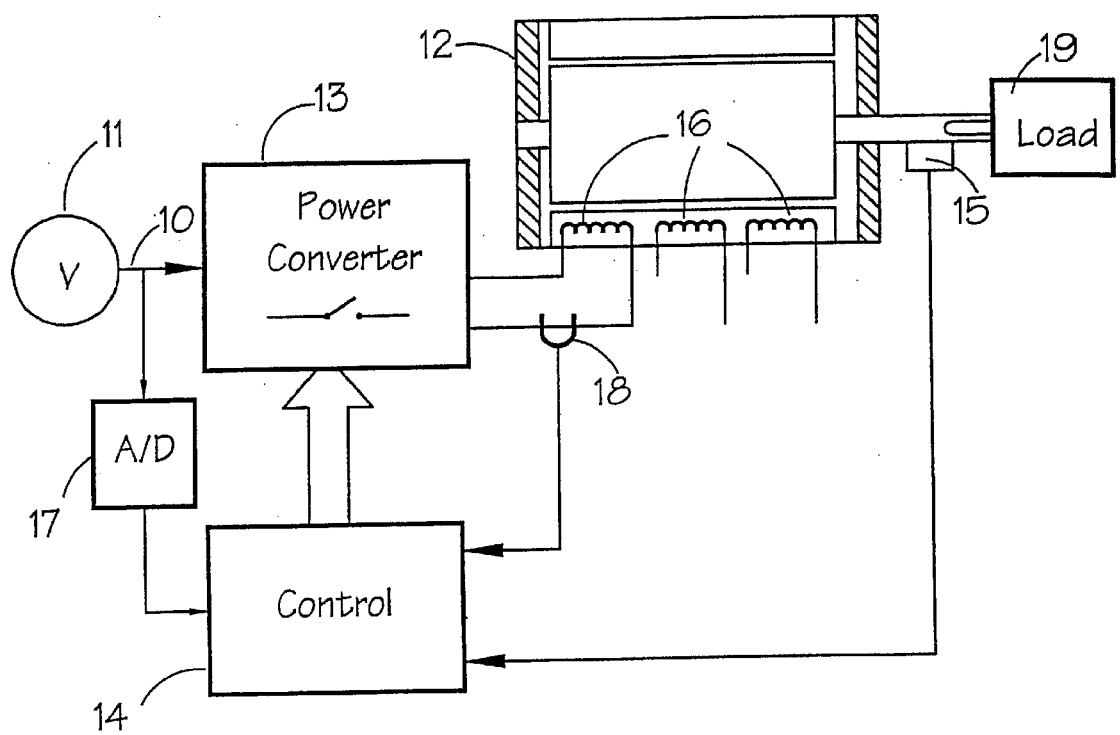
FIG. 5 is a block diagram of a switched reluctance machine, with a DC link voltage compensation arrangement, that can be used to implement embodiments of the invention.

FIG. 5 shows a representation of a switched reluctance machine in which embodiments of the invention can be implemented. The machine of FIG. 5, for example, can be used to implement methods of voltage compensation according to embodiments of the invention. A switched reluctance machine 12 drives a load 19. The drive is supplied from voltage source 11, which can be a DC source or a rectified AC source. The DC link is represented by the connection 10 and is switched by switch means 13 to the phase windings 16 of the machine 12. A controller 14 determines the firing angles for the switch means 13. Also included is a rotor position sensor 15 (RPT), which is influenced by a member attached to rotate with the rotor of the machine 12, for creating a rotor position sensor output signal representative of the position of the rotor. It will be appreciated that position information can be derived by alternative means, including a software algorithm which estimates the information from motor current, voltage and/or inductance. The current in the phase winding(s) is measured by a current transducer 18 of conventional type and supplies appropriate signals to the control system 14.

Connected to the DC link voltage is an analog to digital converter (ADC) 17, which samples the DC link voltage 10 and converts it into a digital output representative of the voltage magnitude of the DC link voltage. The ADC supplies this data to the control system 14. In one embodiment, the ADC output comprises eight data bits, allowing for 256 different voltage levels to be represented.

By monitoring the changes in the rotor position over a given time period, it is possible to determine the speed of the machine 12. The controller 14 performs the function of receiving the rotor position sensor output signal and generating an actual speed signal that corresponds to the actual rotational speed of the rotor. Construction of this speed measurement block will be straightforward to one skilled in the art upon reading this disclosure and depends on the particular rotor position transducer selected. It will be appreciated by those skilled in the art of motor control that the actual speed signal also can be used for other aspects of control of the motor (not discussed here).

Included in the controller 14 is a digital microcontroller such as a microcontroller from Motorola's MC68HC11 family of microcontrollers for implementing DC link voltage compensation according to embodiments of the invention. The same microcontroller may also be used for the other control functions of the motor controller 14. An advantage of this is that DC link voltage compensation can be performed without the need for significant additional circuitry over that already required to implement the motor controller 14.

Control of the motor is accomplished using a compensated speed signal that is used to determine machine operating parameters from a control law table and an improved scaling method, which involves scaling the speed to determine a compensated speed and additionally scaling the torque at the compensated speed in such a way as to restore the original torque demand. A variety of methods can be used to achieve this. In all of these, the first steps are to periodically read signals representing the DC link voltage, using the ADC 17, and the actual rotor speed. Note blocks 21 and 22 in FIG. 6. Each of these signals is converted to a digital representation that can be used for later processing. In practice each of the DC link voltage and the rotor speed could be measured a plurality of times over a predetermined time period and averaged over that time period. In this way, the system is not overly sensitive to minor fluctuations in either of the measured voltage or rotor speed.

In a first example, both the speed and the torque can be scaled by the ratio of:

$$V_c/V_a$$

where $V_c$ is the characterizing voltage and $V_a$ is the actual operating voltage, as sampled by the ADC 17.

Figure 6:
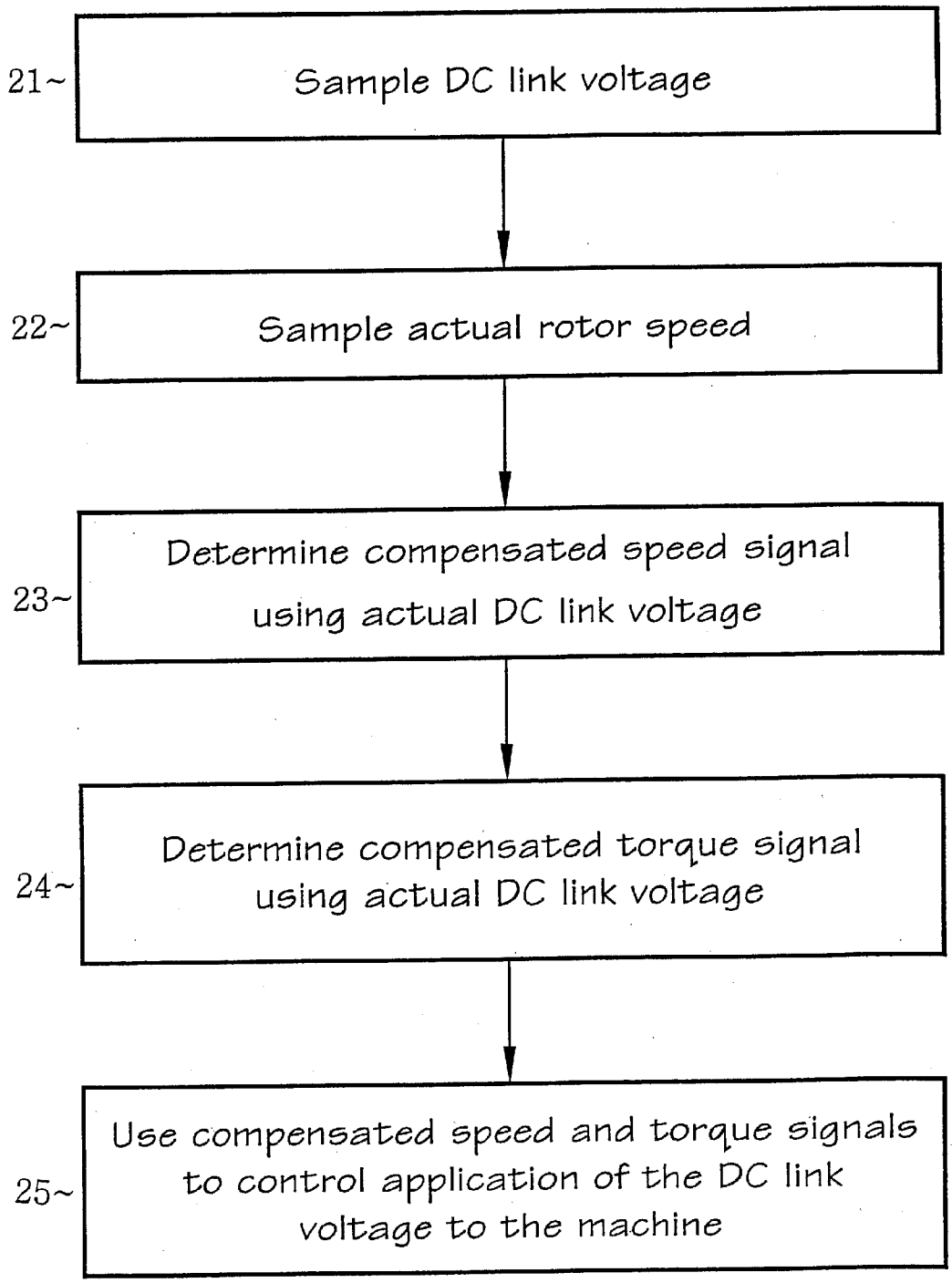
FIG. 6 shows a voltage compensation process according to an embodiment of the invention.

To implement this, software in the microprocessor calculates the ratio of $V_c/V_a$ and multiplies the result with the actual speed signal and the actual torque demand, thereby to provide compensated speed and torque values, blocks 23 and 24 in FIG. 6. The compensated values are then used to interrogate the control law table to determine the operating parameters. Once this is done, the chosen operating parameters are used to selectively apply the DC link voltage to the windings of the stator. Note block 25 in FIG. 6. This gives an elegant method which is remarkably effective in many circumstances and is particularly suited to drives having a constant power characteristic.

Where the torque/speed curve has an unusual shape, the first method described above can be less effective in certain circumstances. To improve performance in this situation, the torque value used to index the table is reset to the value which most closely corresponds to the actual torque demand at the uncompensated speed. In practice, this is done by redefining the location of the torque value in the control law table to be that location which corresponds to the torque value that most closely corresponds to the torque demand at the uncompensated speed. This has the advantage that it is possible to compensate correctly regardless of the shape of the torque/speed profile of the drive. It should be noted that the compensated speed is calculated in the same way as for the first example, i.e. by multiplying the actual speed by $V_c/V_a$.

This method uses knowledge of the absolute value of torque represented by 100% torque demand at each speed. This information can be stored as an extra line in the control law table or any other way convenient for the storage method used. This allows the torque location number for the compensated speed value to be chosen to correspond substantially to the same absolute value of torque demand as was used at the actual speed. In practice, the torque demand values are linearly distributed in the table, so the location number at the compensated speed is given by:

$$L_c = |L_u * TM_u / TM_c|$$

where:

$L_c$ is the location number for the compensated torque demand at the compensated speed, $L_c$ is the location number for the actual torque demand at the uncompensated speed, $TM_u$ is the maximum torque demand at the uncompensated speed and $TM_c$ is the maximum torque demand at the compensated speed.

The compensated speed and torque demand values are then used to interrogate the control law table to determine the desired operating parameters. Once this is done, the operating parameters are used to selectively apply the DC link voltage to the windings of the stator.

In both of the above cases, the controller uses a novel approach to select the correct operating parameters to compensate for changes in the DC link voltage, taking into account the level of torque demanded. This is done using a compensated torque value as well as a compensated speed value, to provide an improved method for compensating for fluctuations in DC link voltage. This is advantageous.

Figure 1:
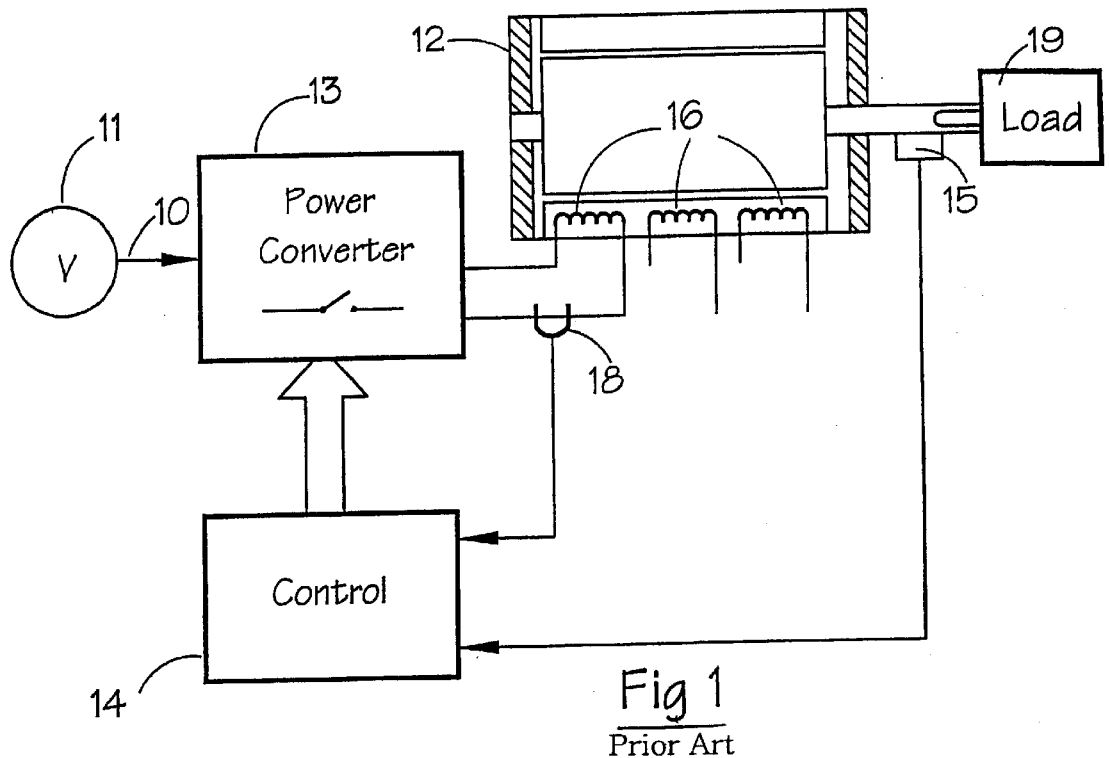
FIG. 1 is a block diagram of a known switched reluctance machine.
Figure 2:
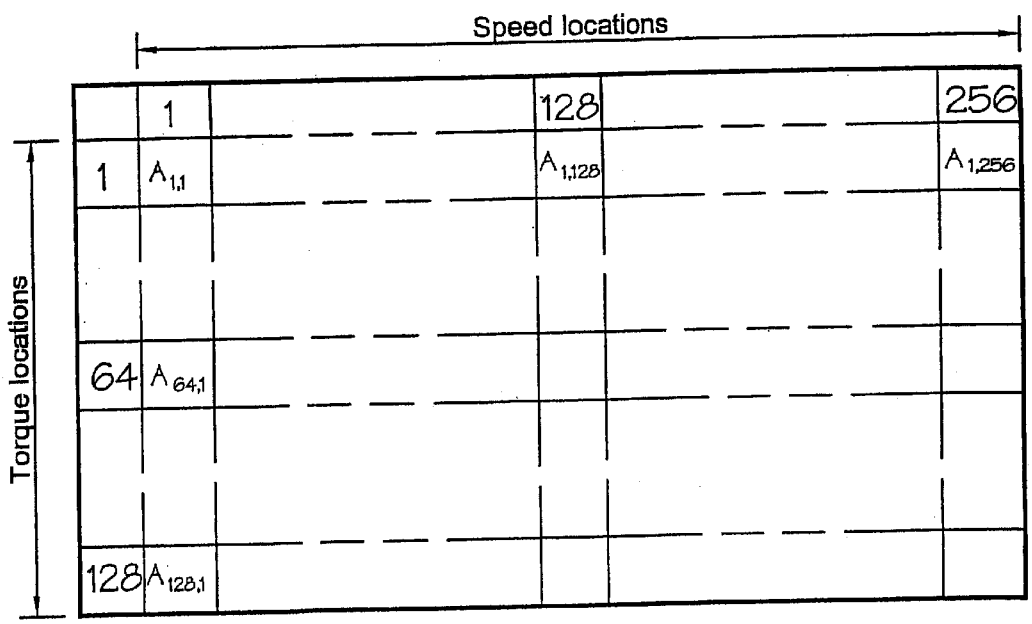
FIG. 2 is an example of a control law table.
Figure 3:
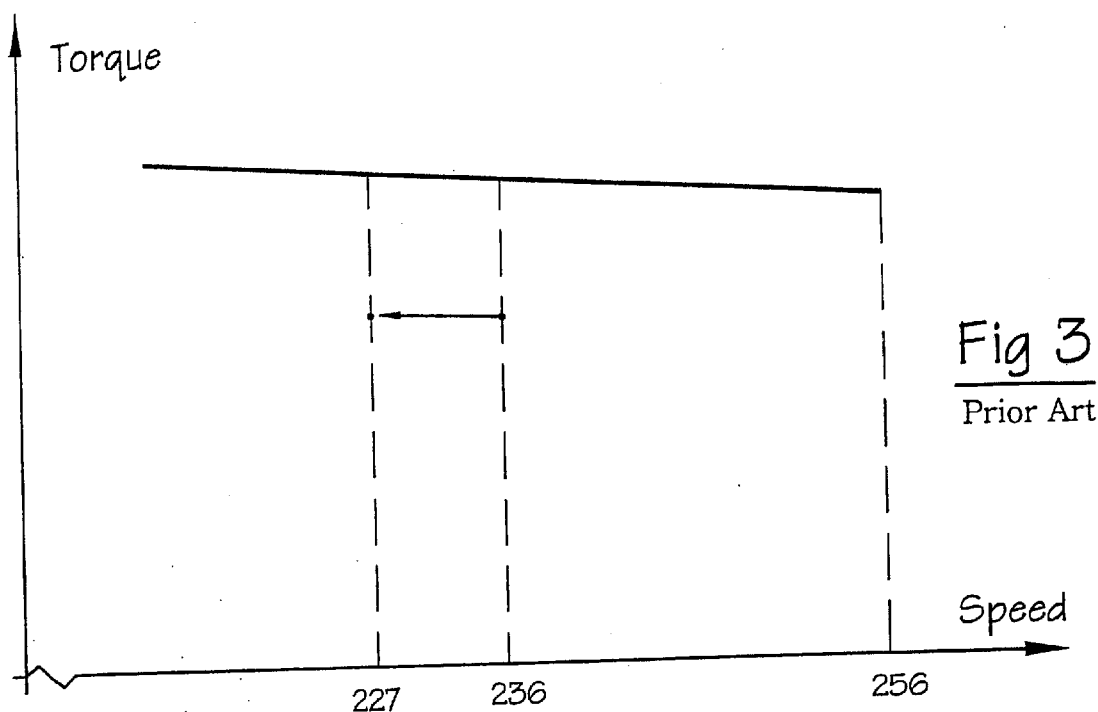
FIG. 3 is a torque/speed map for a system with constant or near constant torque.
Figure 4:
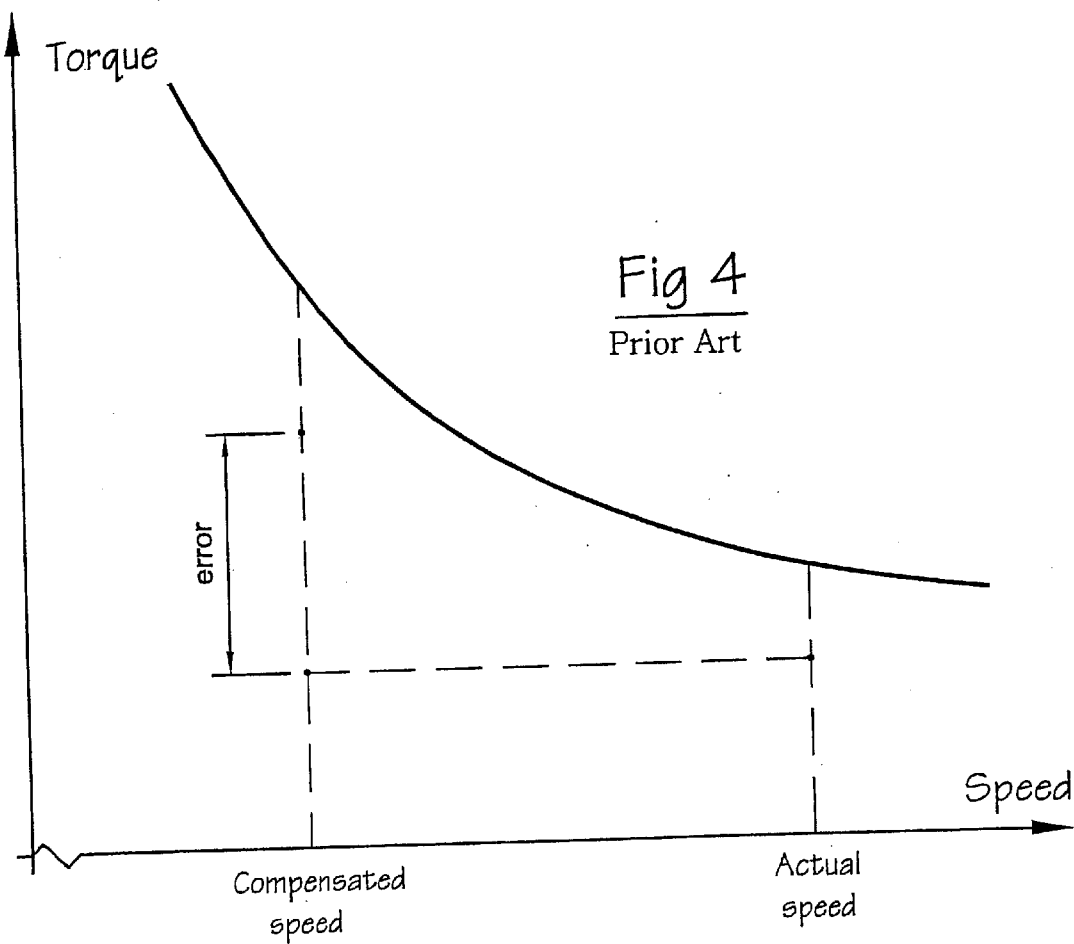
FIG. 4 is a torque/speed map for a system with torque that varies significantly with speed.

In general terms, the voltage chosen for characterizing the system can be chosen anywhere within the operating range of the system. It will be realized that, when the actual voltage for operation is higher than the characterizing voltage, the compensated speed is always lower than the actual speed (see FIG. 4). Similarly, if the operating voltage is lower than the characterizing voltage, the compensated speed will be higher than the actual speed. In this case, if the actual speed is near the maximum operating speed, there may not be sufficient data available to allow the compensated speed value to be used, depending on the difference between characterizing and operating voltages. Unless extra data can be provided for speeds above the maximum speed to be used in practice, the maximum value of compensated speed would need to be limited to the maximum speed. It is therefore preferable that the drive is characterized at the lowest voltage to be used in operation, so that the compensated speed is never greater than the actual speed, thereby avoiding running out of characterization data.

A skilled person will appreciate that variation of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

What is claimed is:

1. A method of compensating for deviations in actual DC link voltage from a reference DC link voltage in an electric drive system including a machine controller that controls a machine in response to a torque demand signal, the machine including a rotor and a stator having windings, the rotor rotating at an actual rotor speed during operation of the machine, wherein the machine controller selectively applies the actual DC link voltage to the stator windings, the method comprising:

sampling the actual DC link voltage;

sampling the actual rotor speed;

determining a compensated speed signal using the actual DC link voltage;

determining a compensated torque demand signal using the actual DC link voltage; and using the compensated speed and torque demand signals to control application of the actual DC link voltage to the stator windings.

2. A method as claimed in claim 1, wherein the step of determining the compensated speed signal involves generating a speed compensation factor and modifying the actual speed by the speed compensation factor.

3. A method as claimed in claim 2, further comprising multiplying the actual speed by the speed compensation factor.

4. A method as claimed in claim 2, wherein the speed compensation factor corresponds to the ratio of the reference DC link voltage and the actual DC link voltage.

5. A method as claimed in claim 1, wherein the step of determining the compensated torque demand signal involves generating a torque compensation factor and modifying the actual torque demand signal by the torque compensation factor.

6. A method as claimed in claim 5, further comprising multiplying the actual torque demand signal by the torque compensation factor.

7. A method as claimed in claim 5, wherein the torque compensation factor corresponds to the ratio of the reference DC link voltage and the actual DC link voltage.

8. A method as claimed in claim 5, wherein the torque compensation factor is dependent on the ratio of a maximum allowed torque demand at the uncompensated speed and a maximum allowed torque demand at the compensated speed.

9. A method as claimed in claim 8, wherein torque demand values for the machine as a function of speed are stored in a control law table having a plurality of locations, each location of the table corresponding to predetermined torque demand value, wherein the step of modifying the actual torque demand by the torque compensation factor is implemented by the step of modifying the control table location of the actual torque demand by the torque compensation factor, thereby to determine the control table location of the compensated torque demand value at the compensated speed.

10. A system for compensating for deviations in actual DC link voltage from a reference DC link voltage in an electric drive system including a machine controller that controls a machine in response to a speed signal, the machine including a rotor and a stator having windings, the rotor rotating at an actual rotor speed during operation, wherein the machine controller selectively applies the actual DC link voltage to the stator windings, the system comprising:

means for sampling the actual DC link voltage;

means for sampling the actual rotor speed;

means for determining a compensated speed signal using the actual DC link voltage;

means for determining a compensated torque demand signal using the actual DC link voltage;

means for transmitting the compensated speed signal and the compensated torque demand signal to the machine controller; and means for using the compensated speed and torque demand signals to control application of the DC link voltage to the stator windings.

11. A system as claimed in claim 10, wherein the means for determining the compensated speed signal comprises means for generating a speed compensation factor and means for modifying the actual speed by the speed compensation factor.

12. A system as claimed in claim 11, wherein the speed compensation factor corresponds to the ratio of the reference DC link voltage and the actual DC link voltage.

13. A system as claimed in claim 10, wherein the means for determining the compensated torque demand signal comprises means for generating a torque compensation factor and modifying the actual torque demand by the torque compensation factor.

14. A system as claimed in claim 13, wherein the means for determining the compensated torque demand signal further comprises means for multiplying the actual torque demand by the torque compensation factor.

15. A system as claimed in claim 13, wherein the torque compensation factor corresponds to the ratio of the reference DC link voltage and the actual DC link voltage.

16. A system as claimed in claim 13, wherein the torque compensation factor is dependent on the ratio of a maximum torque demand at the uncompensated speed and a maximum torque demand at the compensated speed.

17. A system as claimed in claim 16, wherein means are provided for storing torque demand values for the machine as a function of speed in a control law table having a plurality of locations, each location of the table corresponding to a predetermined torque demand value, wherein the means for modifying the actual torque demand by the torque compensation factor is operable to modify the control table location of the actual torque demand by the torque compensation factor, thereby to determine the control table location of the compensated torque demand value at the compensated speed.

18. A computer program on a computer readable medium for use in a system for compensating for deviations in actual DC link voltage from a reference DC link voltage in an electric drive system that includes a machine controller that controls a machine in response to a speed signal, the machine including a rotor and a stator having windings, the rotor rotating at an actual rotor speed during operation, wherein the machine controller selectively applies the actual DC link voltage to the stator windings and the machine further comprises means for sampling the actual DC link voltage and means for sampling the actual rotor speed, wherein the computer program comprises instructions for:

determining a compensated speed signal using the actual DC link voltage;

determining a compensated torque demand signal using the actual DC link voltage; and using the compensated speed and torque demand signals to control application of the DC link voltage to the stator windings.

19. A computer program as claimed in claim 18, wherein the instructions for determining the compensated speed signal comprise instructions for generating a speed compensation factor and modifying the actual speed using the speed compensation factor.

20. A computer program as claimed in claim 19, wherein the speed compensation factor corresponds to the ratio of the reference DC link voltage and the actual DC link voltage.

21. A computer program as claimed in claim 18, wherein the instructions for determining the compensated torque demand signal comprise instructions for generating a torque compensation factor and modifying the actual torque by the torque compensation factor.

22. A computer program as claimed in claim 21, wherein the instructions for determining the compensated torque demand signal further comprise instructions for multiplying the actual torque by the torque compensation factor.

23. A computer program as claimed in claim 21, wherein the torque compensation factor corresponds to the ratio of reference DC link voltage and the actual DC link voltage.

24. A computer program as claimed in claim 21, wherein the torque compensation factor is dependent on the ratio of a maximum torque demand at the uncompensated speed and a maximum torque demand at the compensated speed.

25. A computer program as claimed in claim 24, wherein torque demand values for the machine are stored as a function of speed in a control law table having a plurality of locations, each location of the table corresponding to a pre-determined torque demand value, wherein the instructions for modifying the actual torque demand by the torque compensation factor are operable instead to modify the control table location of the actual torque demand by the torque compensation factor, thereby to determine the control table location of the compensated torque demand value at the compensated speed.

* * * * *